United States Patent
Dziallo et al.

[19]

[11] Patent Number: 6,078,453
[45] Date of Patent: Jun. 20, 2000

[54] METHOD AND APPARATUS FOR OPTIMIZING THE SERVO READ CHANNEL OF A HARD DISK DRIVE

[75] Inventors: Rich A. Dziallo; Mark Hagen, both of Rochester, Minn.

[73] Assignee: Western Digital Corporation, Irvine, Calif.

[21] Appl. No.: 08/967,123

[22] Filed: Nov. 12, 1997

[51] Int. Cl.[7] .................................................... G11B 5/02
[52] U.S. Cl. ....................... 360/55; 360/78.07; 360/78.06
[58] Field of Search .................................. 360/55, 78.06, 360/78.07, 78.05, 78.04, 78.12, 77.02, 77.01, 75, 46, 39; 369/46.27, 66.28, 44.29, 46.34

[56] References Cited

U.S. PATENT DOCUMENTS

| | | | |
|---|---|---|---|
| 5,396,379 | 3/1995 | Mayo | ..................................... 360/38.07 |
| 5,406,535 | 4/1995 | Seo et al. | .......................... 360/78.07 X |
| 5,726,825 | 3/1998 | Phan et al. | ............................ 360/78.07 |
| 5,901,010 | 5/1999 | Glover et al. | .................... 360/78.06 X |

*Primary Examiner*—Muhammad Edun
*Attorney, Agent, or Firm*—Milad G. Shara

[57] ABSTRACT

A method of deriving optimum read channel parameters for use in reading servo sector data from a disk drive having a head mounted on an actuator, a read channel including a preamplifier, a disk having a plurality of tracks, each track having multiple sequentially active servo sectors, a sampled signal head positioning servo controller to control the actuator position, a microprocessor, and a memory. The first step is to store default values and variable test values associated with read channel parameters. The microprocessor is programmed to detect certain servo errors which may occur. The read channel parameters are initially set to the default values in order to ensure that the disk drive can properly perform a seek. A series of seeks is then performed in alternating directions over a band of tracks. While performing the seeks, one of the read channel parameters is set to one of the variable test values for a first set of alternating servo sectors; next, the read channel parameters are set back to their default values for a second set of alternating servo sectors; and servo errors which occur during the series of seeks are recorded. This process is repeated for each of a predetermined matrix of test values. At the end, each of the read channel parameter values resulting in the least errors logged is identified as being optimal, and a table of optimized read channel parameter values is stored in the disk drive.

21 Claims, 7 Drawing Sheets

METHOD AND APPARATUS FOR OPTIMIZING THE SERVO READ CHANNEL OF A HARD DISK DRIVE

FIELD OF THE INVENTION

The present invention pertains to a method and apparatus for optimizing the servo read channel of a hard disk drive while performing seek operations.

BACKGROUND OF THE INVENTION

Hard disk drives offer a convenient, efficient, and cost effective way to store vast amounts of digital data used by virtually every computer system ranging from mainframes, workstations, and desktop personal computers to portable laptop computers. Basically, data is stored magnetically as a series of magnetic transitions representing bit strings consisting of "1's" and "0's." One or more transducers are used to write the data onto the surfaces of spinning, magnetically coated disks. The data is written to a number of circular, concentric "tracks." Later, the pre-recorded data is read back from the tracks by detecting changes in the polarities of the magnetic domains representing the bits of data.

A servo controller is used to control an actuator for physically positioning the transducer over the correct track of the disk during the read/write process. The act of moving the transducer to the desired location is known as a "seek"operation. Servo information, used to provide position feedback to the servo controller, is recorded onto the disks at specific, pre-defined locations. In a preferred embedded servo system each track has a plurality of equally spaced apart servo sectors or "wedges" containing the servo information. This servo information is read during the seek operation to help guide the servo system to the correct track and to provide the requisite timing synchronization. Once the correct track is located, servo "bursts" recorded onto the disks are used to make minor adjustments to the actuator so that the transducer properly follows the track.

Unfortunately, there are many factors which may cause a servo error. One reason for servo errors relates to the fact that the servo data residing in the servo sectors is read back as electrical signals in the form of pulses by the transducer. The level of the readback pulses are typically so low that they are highly susceptible to becoming distorted. The electrical pulses may be corrupted by noise or by other external signal sources. The servo data is usually conditioned by a read channel integrated circuit chip, which provides signal conditioning circuitry controlled programatically by setting parameters in registers within the chip. Conventionally a standard or "default" set of parameters, developed during the design of disk drive, is applied during the reading of servo sectors. Because the head and media characteristics varies from surface to surface and drive to drive in a mass production process, the signals produced by the head and presented to the read channel may result in the default parameters being sub-optimal, causing rejection of a disk drive. In order to achieve high quality, each individual hard disk drive must be tested thoroughly in order to ensure that its servo system works properly and is reliable.

Thus, there is a need for some method and apparatus which could automatically determine the optimal parameters for tuning the servo systems of hard disk drives so as to minimize servo errors. The present invention provides such a solution.

SUMMARY OF THE INVENTION

The present invention pertains to a method of deriving optimum read channel parameters for use in reading servo sector data from a disk drive having a head mounted on an actuator, a preamplifier for amplifying signals from the head, a read channel for conditioning the signals using parameters, a disk having a plurality of tracks, each track having multiple sequentially active servo sectors, a sampled signal head positioning servo controller to control the actuator position, a microprocessor, and a memory. The method provides default values and variable test values to which read channel parameters can be set. Additionally, the microprocessor is programmed to detect certain servo errors which may occur. The read channel parameters are initially set to the default values in order to ensure that the disk drive can properly perform a seek. A series of seeks is then performed in alternating directions over a band of tracks. During these seeks, a selected read channel parameters is set to one of the variable test values for a first set of alternating servo sectors; subsequently, the read channel parameters are set back to their initial default values for a second set of alternating servo sectors; and servo errors which occur during the seeks are recorded. This process is repeated for each of a predetermined matrix of test values. In the end, the read channel parameter values resulting in the least errors logged are identified as being optimal, and a table of optimized read channel parameter values is stored in the disk drive. Thereby, the disk drive can read the optimal parameter values from storage and set its read channel parameters to operate at peak performance.

In another embodiment, the process described above can be performed for each of the zones of each surface of each of the disks in the hard disk drive. Different zones may exhibit different optimal read channel parameter values. These groups of optimal set of read channel parameter values are then stored onto a disk. Afterwards, when the disk drive is performing a normal read or write operation, the read channel parameters are set to their optimal values corresponding to the zone containing the track that is being accessed.

BRIEF DESCRIPTION OF THE DRAWINGS

The operation of this invention can be best visualized by reference to the following drawings.

DETAILED DESCRIPTION

Figure 1:
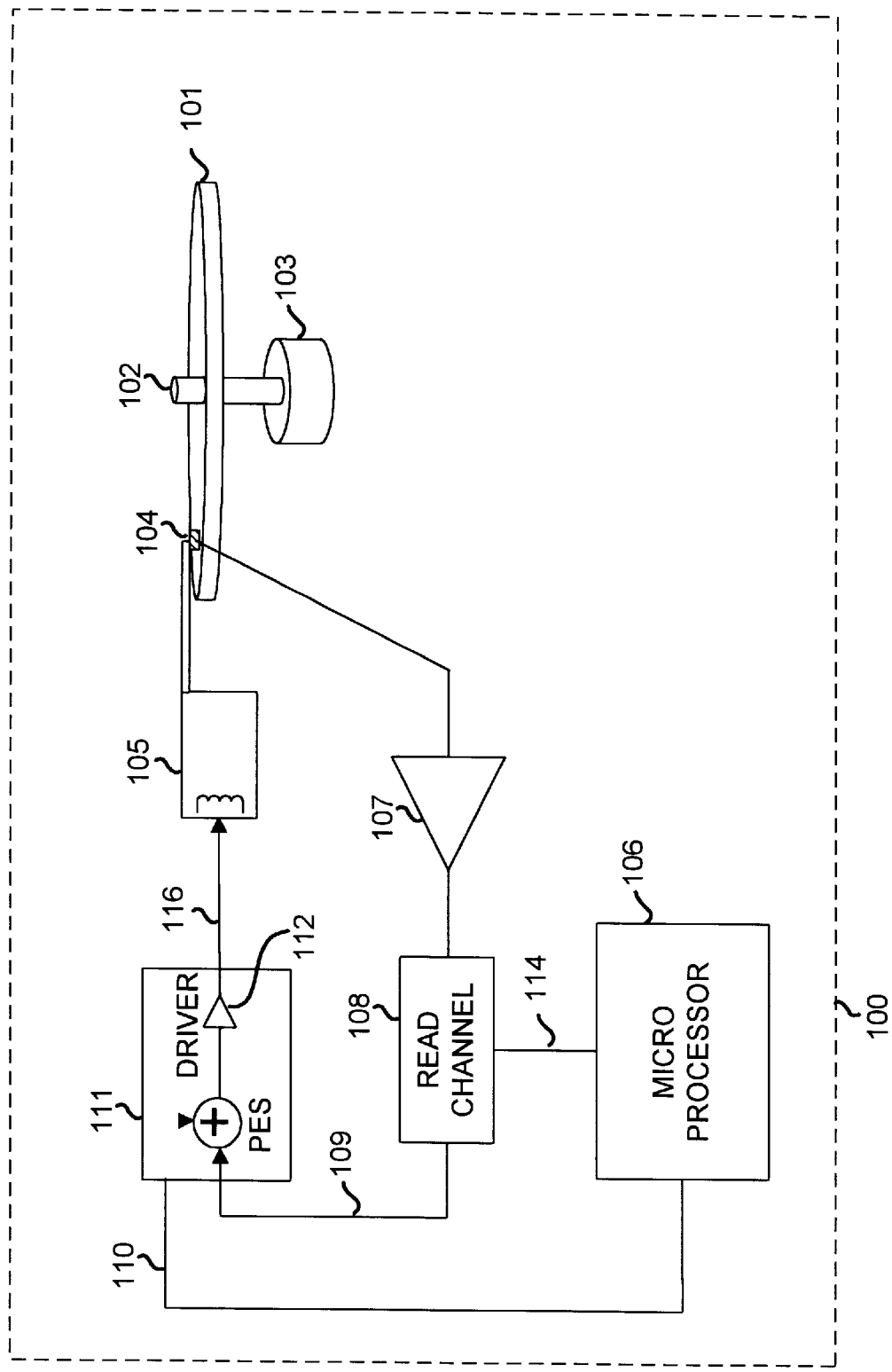
FIG. 1 shows a block diagram of a hard disk drive having a servo controller and read channel upon which the present invention may be practiced.

A method and apparatus for optimizing the servo read channel of a hard disk drive while performing seek operations is described. FIG. 1 shows a block diagram of an exemplary servo system of a hard disk drive upon which the present invention may be practiced. A magnetic disk 101 is rotated about a spindle 102 by spindle motor 103. Data and servo information are recorded onto the surface of disk 101. A transducer or "head" 104 is used to write the data onto disk 101. When using inductive heads, the same head 104 may also read the data and servo information from disk 101. However, for newer disk drives, a combination of inductive and magneto-resistive (MR) heads is being used to perform the read/write operations. The present invention can be used in inductive-only or in combination with MR heads as well as in other types of disk drives. An actuator 105 rotates about a pivotal axis to physically move the head 104 radially across the surface of spinning disk 101. It should be noted, however, that most disk drives have multiple disks 101 which are stacked and spun together about spindle 102 and that data and servo information are recorded on both surfaces of these disks. A separate transducer 104 is provided for each of these surfaces.

Typically, when a host computer system (not shown) instructs the disk drive to perform either a read or write operation, a seek is initiated by microprocessor 106 to position the head over the track where the data is located. For a write operation, the head 104 must be moved to an available sector. For a read operation, the head 104 must be positioned over the track having the sector which contains the desired data. In order to perform the seek, servo information is first read from disk 101 to determine the present position of head 104. The electrical signal from head 104 representing the servo information is amplified by preamplifier 107. Additional signal processing is performed on the amplified servo information signal by read channel 108 including Automatic Gain Control (AGC), filtering, and pulse detection. The processed present position signal indicating the present position of head 104 is then input to a servo controller 111 on line 109. A desired position signal indicating the destination track to where the head 104 should be moved to is generated by microprocessor 106 and output on line 110 to the servo controller 111. Servo controller 111 compares the present position signal against the desired position signal and generates a difference signal, known as a position error signal (PES). The servo controller then determines a command effort which is driven by driver 112 on control line 116 to cause actuator 105 to move head 104 to a new position. In other words, the PES signal is used to control the position of the head 104. Often, the servo controller includes an estimator circuit which is used to provide an estimated position of the head. Furthermore, the servo controller also applies an acceleration profile for performing the seek as fast as possible, given the physical constraints of the actuator. This process of moving the head and comparing the position signals to form a PES continues until the head is correctly positioned over the destination track.

Figure 2:
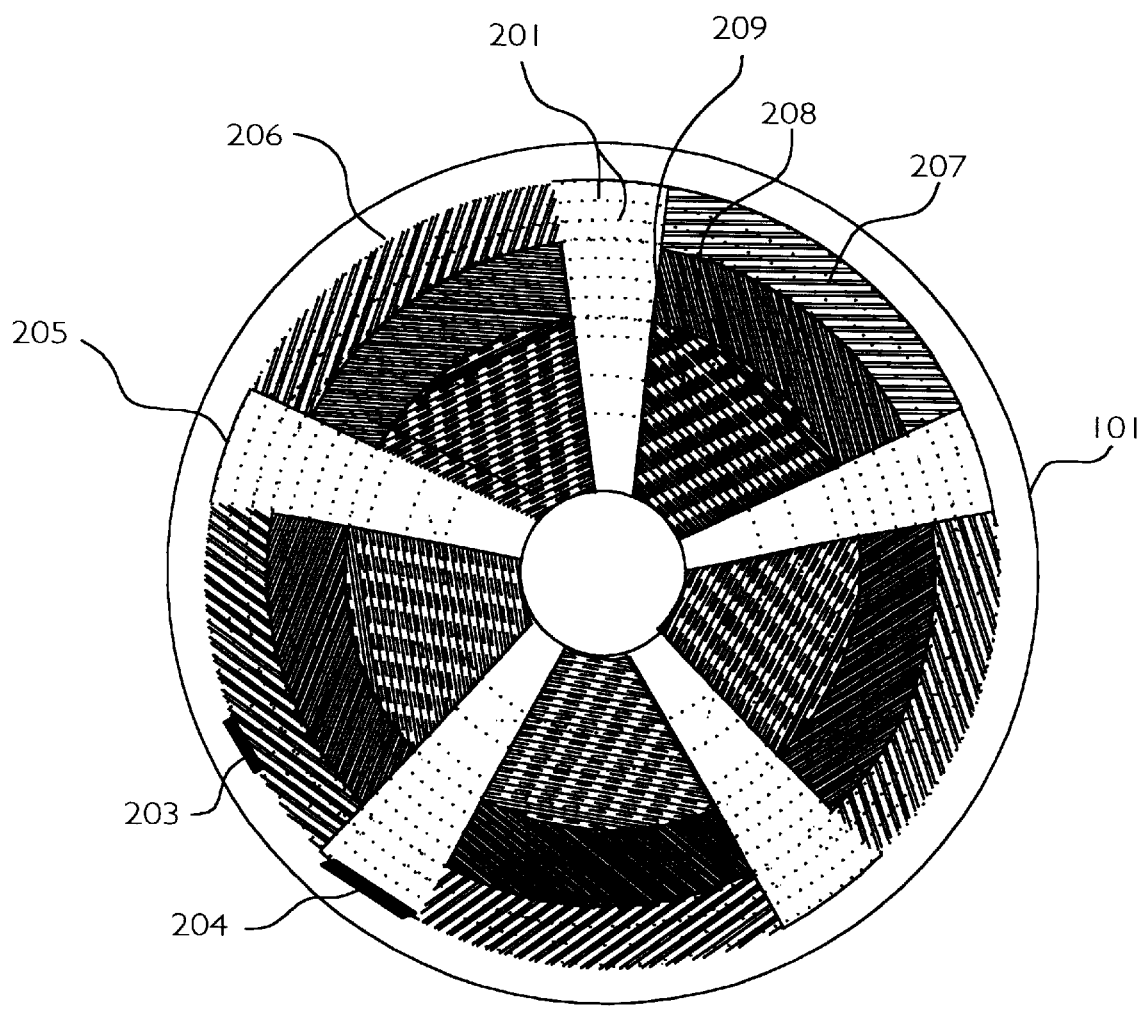
FIG. 2 shows the layout of a disk formatted to provide a preferred embedded servo system and having multiple zones.

FIG. 2 shows an exemplary formatted disk which can be used in conjunction with the present invention. The surface of disk 101 comprises a number of concentric tracks 201. Digital information, such as user data and servo data, are stored upon these tracks 201 in the form of either a data sector 203 or a servo sector 204. There are a number of servo sectors per track. These servo sectors are spaced apart at regular intervals. As such, the servo sectors form "servo wedges" 205. Likewise, the data sectors form "data wedges" 206. Furthermore, the tracks are grouped into a number of zones 207, 208, 209, which have data recorded at different frequencies according to zone bit recording methods, as is well known in the art.

Figure 3:
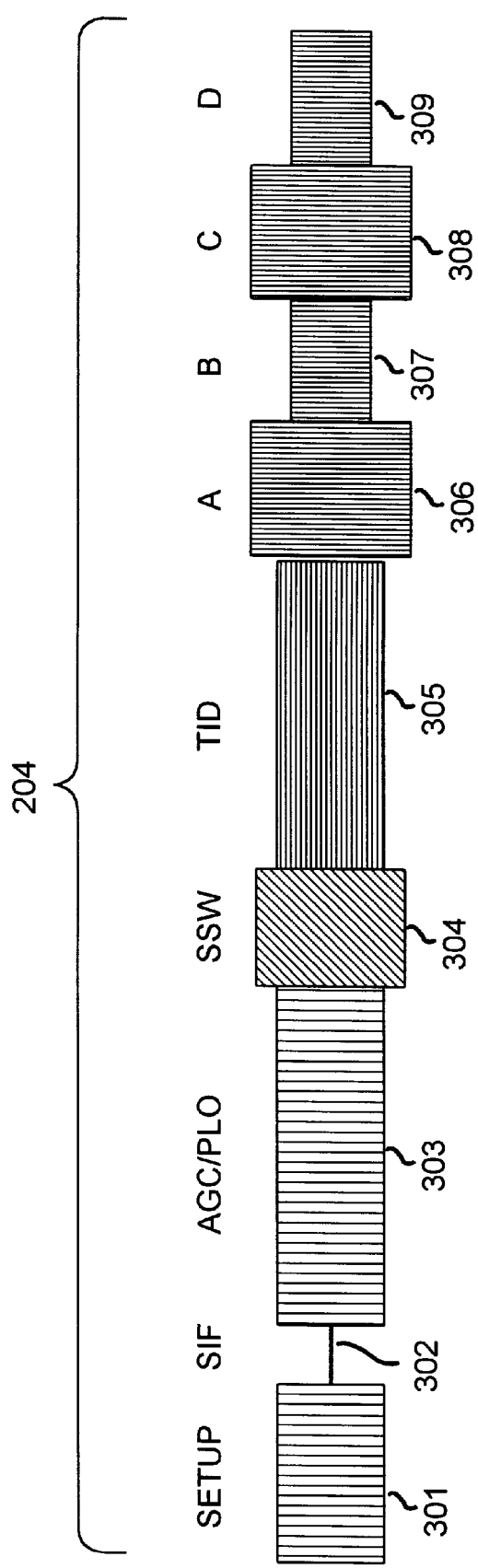
FIG. 3 shows the fields comprising a preferred servo sector in an embedded servo system.

FIG. 3 shows a typical servo sector 204 field format. Before servo data can be read, there must be time to recover from a write to a read operation. This time is represented by a fill or setup field 301. Consequently, the area just before the servo wedge is not formatted for storing user data. Instead, a setup pattern is provided in this area in order to provide the AGC circuitry with a signal to track. Additionally, the setup field 301 serves to delineate a servo initialization field (SIF) 302. Basically, the SIF field 302 provides a pattern that the disk drive uses in its synchronous detection efforts when trying to lock on to the servo data. An automatic gain control/phase lock oscillator (AGC/PLO) field 303 follows. The AGC/PLO field's function is to define the AGC amplitude in the read channel and to lock the data separator phase lock loop. Next, a servo sync word/index sync word (SSW) field 304 is used to provide for a fault tolerant sync word. The SSW 304 is commonly referred to as a timing mark; it provides a reference to define read byte boundaries. One servo sync word in each track serves an index to define the first servo sector in the track. Following the SSW field 304 is a track identification (TID) field 305. The TID field contains identification information which uniquely identifies a particular track or cylinder. In embedded servo disk drives, it is necessary to read track identification information while a transducer head is moving radially across a rotating disk, as well as when the transducer is centered over a particular track. Accordingly, a binary track identification number is mapped to a Gray code ( as is known, a Gray code is a modified binary code in which sequential numbers are represented by expressions that differ only in one logical bit) before being written to the TID field 305. Thereby, it is possible to determine the position of the transducer even as it diagonally cuts across fields on adjacent tracks and reads a first part of the TID field of one track and then a second part of the TID of an adjacent track. Finally, a number of fields 306–309 containing servo bursts "A–D" are used to indicate the position of the transducer with respect to the track center. These servo bursts are used in for track following modes to precisely position the head over a track.

Figure 4:
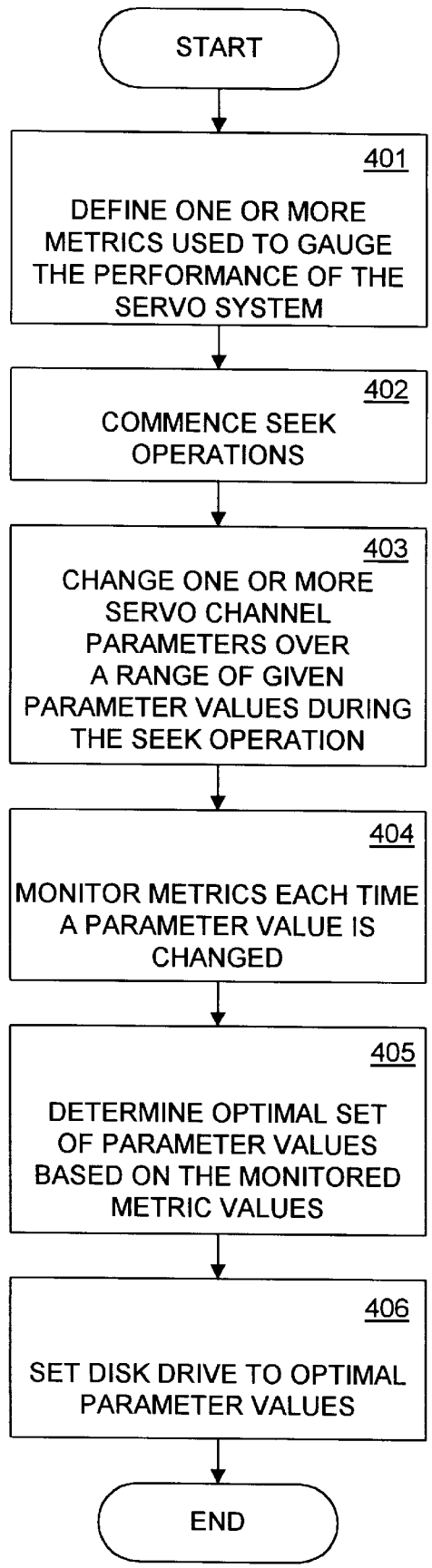
FIG. 4 is a flowchart describing the basic steps of the invention for optimizing read channel parameters for reading servo sectors.

FIG. 4 is a flowchart describing the basic steps for performing the servo optimization process of the present invention. Initially, one or more metrics are defined, step 401. These metrics are used to gauge the performance of the servo system. There are many different metrics by which one can use to measure the performance of the servo system. In the currently preferred embodiment, two metrics are used. The first metric relates to the number of missed timing marks. Given a constant spindle rate and equidistant timing marks, the disk drive can use this as a timing reference for reading the servo data off the disk. If an expected timing mark is not detected, the controller residing within the disk drive takes note of this "miss" and stores the number of misses in a temporary buffer. The other metric used in the currently preferred embodiment relates to the number of erroneously read Gray encoded track identification (ID) 305 values. Each track is assigned a unique track ID 305 value to identify that particular track. This track ID 305 value is Gray encoded before being written onto the disk in order to eliminate any ambiguities when being read. In an alternative embodiment, another type of predetermined error relates to the magnitude of the difference between an estimated position and a measured position.

Once the metrics have been defined, the disk drive is instructed to commence a series of seeks, step 402. The seeks involve performing a number of seeks in alternating directions (e.g., back and forth), commonly referred to in the disk drive industry as "butterfly" seeks, over a range of different tracks. During these seeks, one or more servo channel parameters are changed through a range of predetermined parameter values, step 403. There are a number of different servo channel parameters which can be adjusted in order to tune the servo system. In the currently preferred embodiment, four different parameter values are varied. These parameters include the pulse detector threshold level, the low pass cutoff frequency of the filter, the high frequency boost of the AGC, and the bias current for the MR head. The pulse detector threshold is a voltage level which is set so that only those pulses read from the disk which exceed the threshold voltage are deemed to be valid. All other signals or pulses falling below the threshold voltage are ignored. The threshold voltage can be set lower to increase the pulse detection sensitivity. However, lowering the threshold voltage may result in the false detection of spurious pulses. Hence, setting the pulse detector threshold involves tradeoffs. The AGC circuit is basically an amplifier/filter circuit which is used to control the pulses. The shape, amplitude, and form of the pulses can effectively be altered by varying the low pass cutoff frequency and high frequency boost associated with the AGC circuit. The goal is to achieve a cleaner output pulse waveform by adjusting the AGC parameters. However, certain AGC parameter values may actually cause the pulse waveform to worsen. The bias current relates to the current caused to flow through the MR head stripe. Again, there is a particular point at which the amount of current should be set in order to attain the best results from the transducer.

During seek operations, the values corresponding to these four parameters are changed so as to cover a range of different possible combinations. The goal is to find the particular set of parameter values which best optimizes the performance of the servo system. Testing each parameter separately by changing its values and determining the best value for that parameter may or may not result in the best set of parameter values. This is due to the fact that changing one parameter value can affect the performance with respect to one or more of the other parameter values. Even though each individual parameter value is optimized in isolation, their combination might not produce the best overall optimization. Hence, each of the different combinations of the various parameter values taken as a whole should be determined. There are many different approaches which can be used to efficiently run through all the different combinations. One approach is known as the design of experiments method, which utilizes an orthogonal matrix to evaluate each parameter in isolation and combination. Another approach which can be used is the full factorial algorithm, whereby all possible servo channel settings within a fixed range are tested. Either of these two approaches or an alternative approach may be used with the present invention.

Each time one of these parameter values is changed during the seeks, the metrics are monitored, step 404. The metrics which indicate the condition when the servo system is operating at peak performance is then determined, and the set of parameter values corresponding to the best measured metrics is deemed to be the most optimal, step 405. The most optimal set of parameter values are stored on the disk, and the disk drive parameters are set according to these values, step 406. For example, the number of missed timing marks can be added together with the number of erroneous Gray encoded track IDs. The sum of these two metrics gives a value indicating how many errors were detected over a period of time for a given set of parameter values. The point at which the lowest number of errors occurs based on the sum of these two metrics indicates the condition at which the servo system is operating at its peak performance. The pulse detector threshold level, low pass cutoff frequency of the AGC filter, high frequency boost of the AGC, and bias current of the disk drive are then set according to the values corresponding to the metrics indicating the fewest number of errors. The set of parameter values and their corresponding metric values can be stored in a table and then looked up or a running computation of the best set of parameter values can be updated after each set of measurements is taken.

It should be noted that the present invention can also be adapted to operate in a track follow mode rather than the seek mode as described above. In other words, steps 403–405 can be executed while the servo system is following a track instead of seeking. However, the seek mode implementation is preferred over the track following implementation because seeks impose more stresses, tolerance swings, and variations on the disk drive in general and more specifically, on the servo system which is being optimized.

In the currently preferred embodiment, the servo system parameters are optimized for each of the separate disks, disk surfaces and more specifically, the different zones of a given disk surface. The "zones" in which the optimization is performed may be directly determined by the boundaries relevant to zone bit recording or they may be arbitrarily established at different points across the disk radius such as an inner zone, an outer zone, and a mid-point zone. For instance, the servo optimization process described above is run while the seek is executed over a first one of the zones. Thereby, the servo parameters that are most optimal for that first zone can be determined and stored. The servo optimization process is repeated for each of the different zones. Consequently, each zone of each surface of each disk will have its own set of optimal servo parameters. In this manner, not only can variations from head to head be compensated, but variations across each disk can be tuned out as well. Whenever a seek relating to a normal read/write operation is initiated, the zone over which that particular seek is to be performed, is determined. The servo parameters corresponding to that zone is then read, and the servo system is then tuned to these specific optimal parameters.

Figure 5:
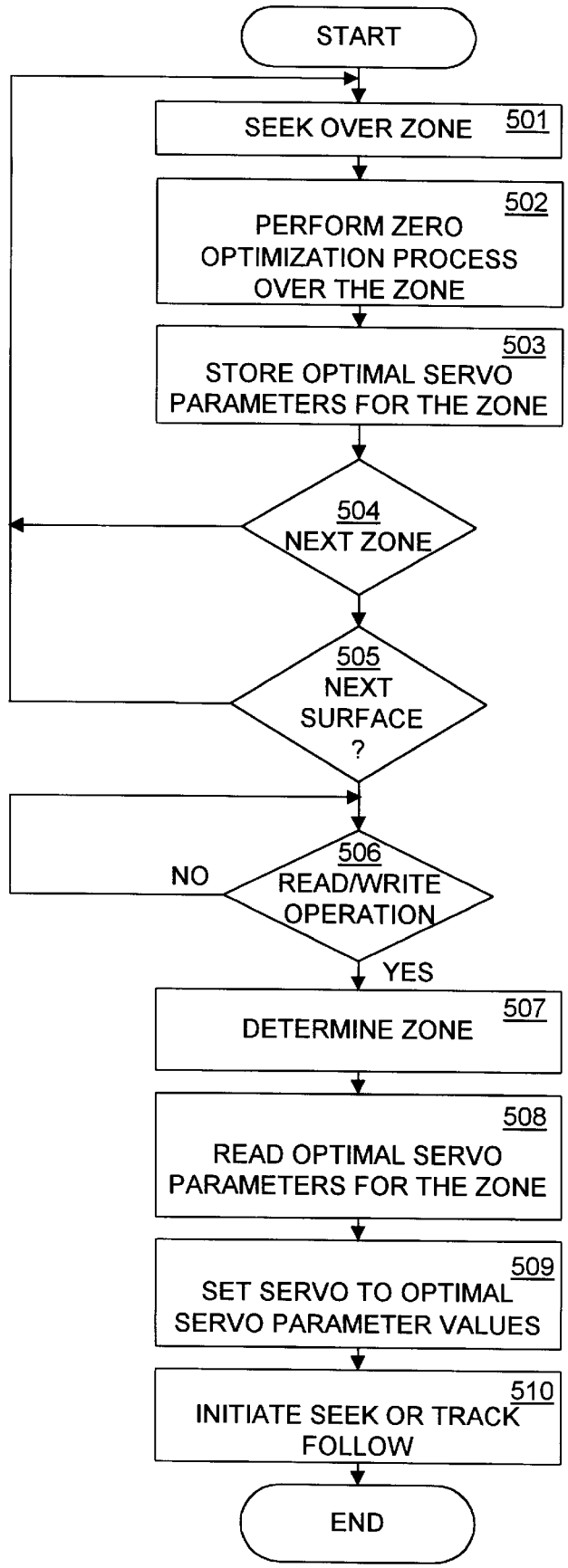
FIG. 5 is a flowchart describing the steps for optimizing read channel parameters for reading servo sectors at different zones on the disk.

FIG. 5 is a flowchart describing the steps for optimizing servo parameters across a number of zones. Initially, a series of seeks are performed over a first zone, step 501. While the seeks are being executed, the optimal servo parameters are found, step 502. This set of servo parameters which are optimal for this first zone is stored onto the disk, step 503. Step 504 calls for repeating steps 501–503 for each zone of a surface. Step 505 calls for repeating steps 501–504 for each disk surface of the disk drive system. Thereby, whenever a read or write is executed during a normal mode of operation, as determined in step 506, the zone corresponding to the read or write is determined, step 507. Next, the servo parameters corresponding to that zone is read off the disk, step 508. The servo system is then tuned to the servo parameters. Thereafter, the seek process corresponding to the read or write operation commences, step 510.

Figure 6:
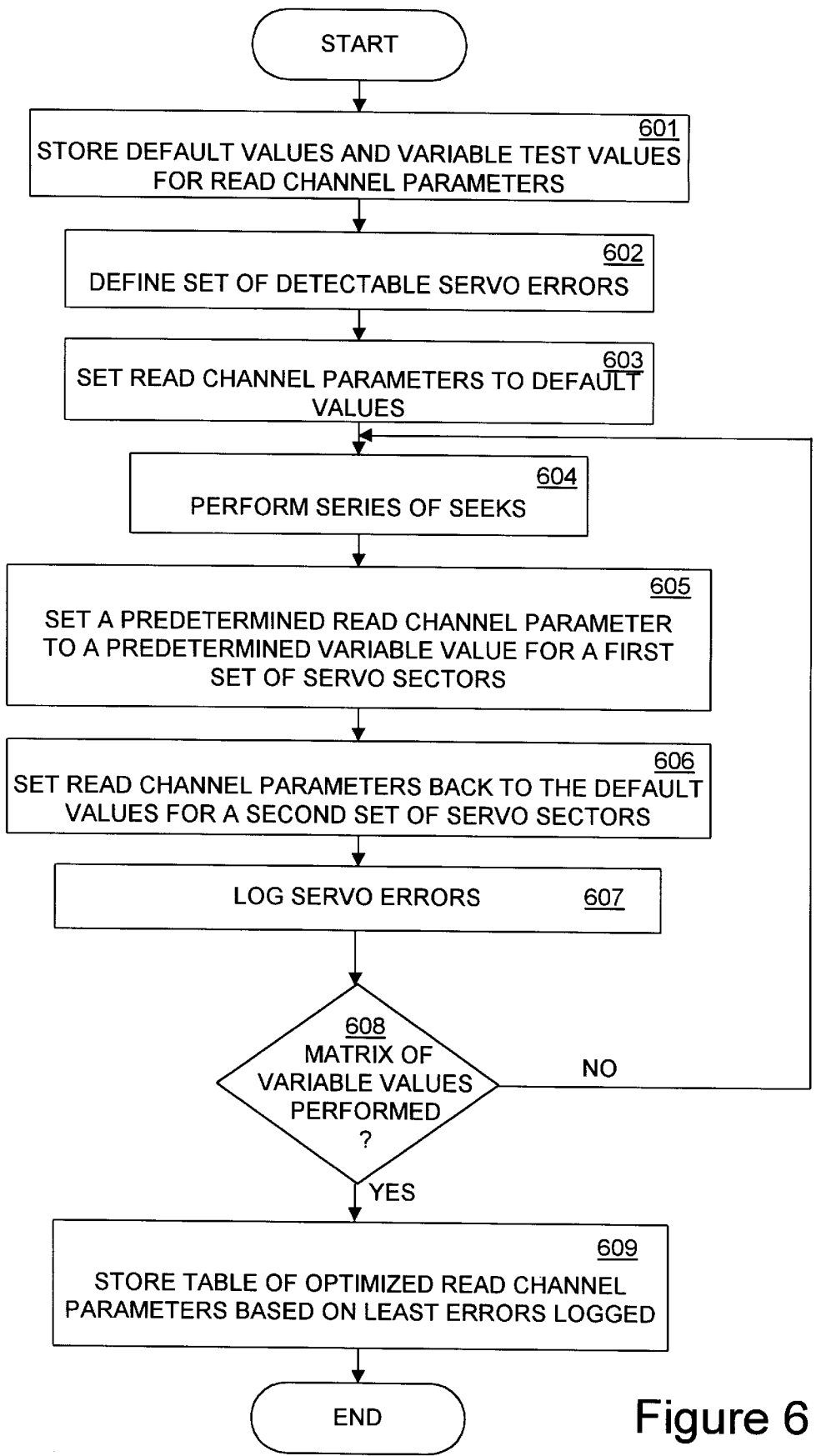
FIG. 6 is a flowchart describing the steps for performing the currently preferred embodiment of the present invention.

FIG. 6 is a flowchart describing the steps for performing the currently preferred embodiment of the present invention over a zone of the disk. In order to ensure against the possibility of the servo controller going off-track, a number of default values for setting the read channel parameters is stored in a table, list, array, or some other fashion. In addition, certain variable "test" values to which the read channel parameters may be set, are also similarly stored at step 601. The microprocessor is programmed to detect particular servo errors, step 602. The parameters of the read channel are initially set to the default values, step 603. Thereupon, a series of seeks in alternating directions over a specified band of tracks is performed, step 604. During these seeks, steps 605–607 are performed. In step 605, a predetermined one of read channel parameters is set to a predetermined one of the variable values. One or more servo sectors later, the read channel parameters are set back to the default values. The read channel parameters are thusly set to either test values or default values for alternating sets of servo sectors. Meanwhile, the microprocessor logs all servo errors which occur during the series of seeks, step 607. Step 608 instructs that steps 604–607 be repeated for each of a predetermined matrix of test values. In other words, the seeks are performed so that different combinations of test values can be tested. Finally, those read channel parameter values resulting in the fewest number of logged errors are identified as being the most optimal. The set of optimized read channel parameter values is then stored in the disk drive for subsequent use, step 609.

Figure 7:
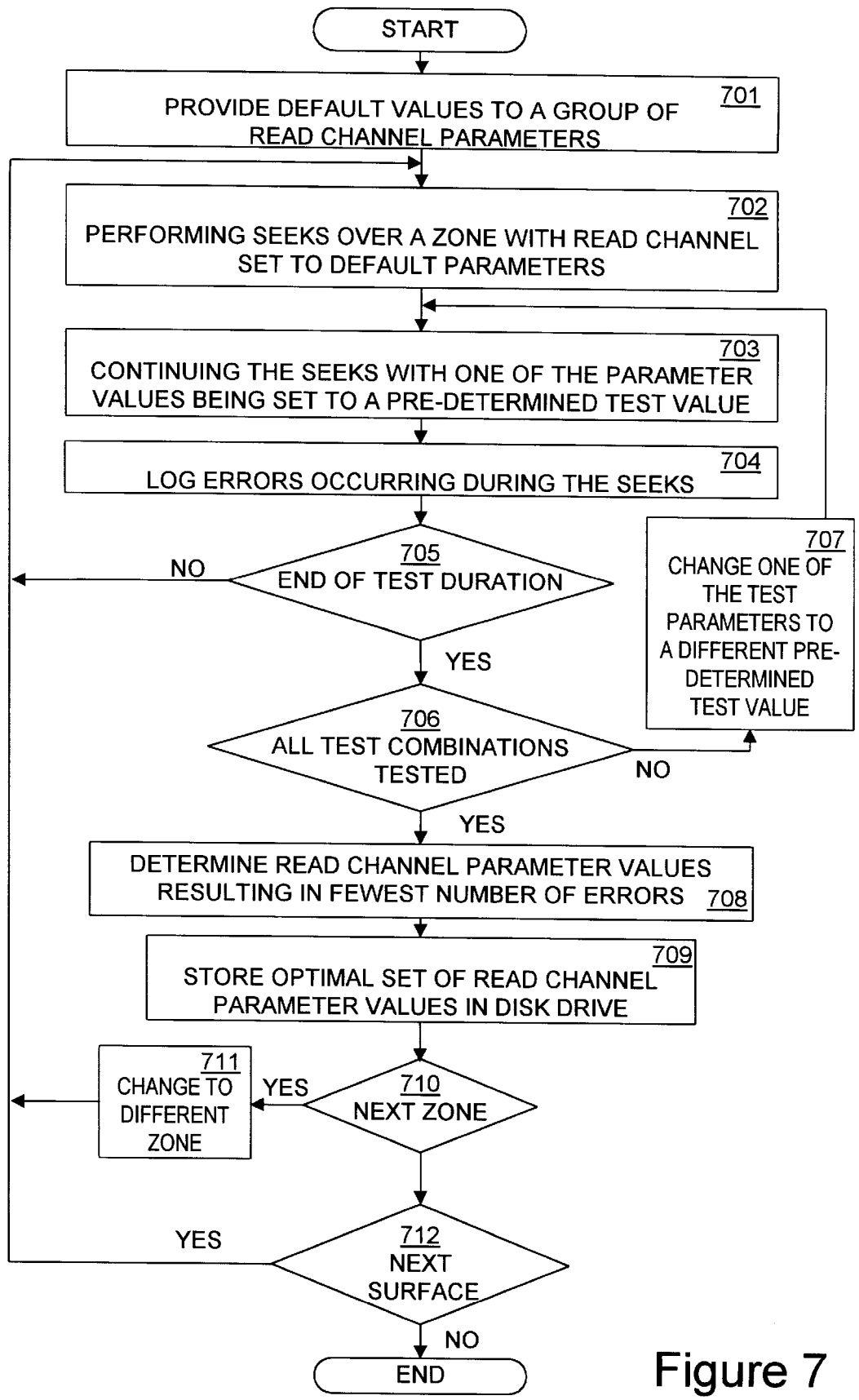
FIG. 7 is a flowchart describing the steps for performing an alternative embodiment of the invention.

FIG. 7 is a flowchart describing the steps for performing an alternative embodiment of the present invention. Initially, a group of read channel parameters are assigned default values, step 701. For example, the pulse detector threshold level, the low pass cutoff frequency of the automatic gain control (AGC) filter, the high frequency boost of the AGC, and the bias current are assigned default values. The default values are set at their respective midpoint operating range to ensure that the read channel works properly. Although these default values may not be optimum, they are sufficient to keep the servo system operational so that it does not go open-loop. A series of seeks are performed within a particular zone, step 702. During the seeks of step 702, one of the read channel parameter values at a time is changed to that of a pre-determined test value, step 703. The pre-determined test values can be retrieved from a list, table, or matrix residing either on the disk or in some other type of non-volatile memory (e.g., read only memory-ROM, flash memory, etc.). Also during the seeks of step 702, the number of errors detected is counted or logged in step 704. Steps 702–704 are repeated until a pre-determined test duration ends according to step 705. Generally, a longer test duration with more error sample measurements produces better results. The reason for cycling between default values and test values in steps 702 and 703 is to prevent the seeks from failing. In some instances, certain test values might cause the servo to go out of control. In these cases, periodically reverting back to default values will keep the servo system working properly. In the currently preferred embodiment, the process alternates between seeking with the read channel parameters set to default values and seeking with the read channel parameters set to test values.

Step 706 causes the process of steps 702–705 to be repeated for each of the possible test combinations within a given range of parameter values. This can be accomplished by reading from a pre-determined matrix, list, or table of read channel parameter values. If there is still another combination which has yet to be tested, step 707 is performed. In step 707, one of the read channel parameters is set to a different pre-determined test value, resulting in a parameter combination which has not been tested yet. Thereupon, step 703 is executed. In an alternative embodiment, the test steps of 703–705 are repeated for all pre-determined test values for a given parameter and this process is repeated for all the different read channel parameters.

When all the pre-determined test values for each of the read channel parameters have been tested, step 708 determines the most optimal set of parameter values. The most optimal set is the one which resulted in the fewest number of errors, according to the log of step 704. In an alternative embodiment, this determination can be made as an on-going part of the testing process, whereby the first set of test values is deemed the current optimal set. A successive test set which results in a fewer number of errors than the current optimal test set supersedes that test set and becomes the current optimal set. This process continues until the testing process of steps 702–706 completes. After the most optimal set of read channel parameter values has been determined, it is stored in the disk drive, step 709. A determination is then made in step 710 as to whether all the zones of a disk have been tested so that an optimal set of read channel parameter values is found for each of the zones. If a zone has not yet been tested, step 711 is executed. In step 711, the seek is set to that zone and steps 702–709 are repeated. Lastly, step 712 determines whether all the surfaces of each of the disks of the disk drive have been tested. If a surface has not been tested, steps 702–711 are repeated for than surface. In one embodiment, multiple surfaces are tested simultaneously. At the end of step 712, a record of all the different optimal set of read channel parameter values for all the different zones of each surface of each disk is found and stored. Thereby, when the disk drive is in its normal mode of operation (i.e., reading and writing data to/from the disk), the read channel parameters for servo sectors are set to the optimal set of values that was found as part of the test process.

Thus, a method and apparatus for optimizing the servo read channel of a hard disk drive while performing seek operations has been described.

What is claimed is:

1. In a disk drive having a head mounted on an actuator, a preamplifier for amplifying signals from the head, a read channel for conditioning the signals using parameters, a disk having a plurality of tracks, each track having multiple sequentially active servo sectors, a sampled signal head positioning servo controller to control the actuator position, a microprocessor, and a memory, a method of deriving optimum read channel parameters for use in reading servo sector data, the method comprising:
   a) providing a table of read channel parameters having default values;
   b) providing a table of read channel parameters having variable values;
   c) defining a set of servo errors detectable by the microprocessor;
   d) applying the table of default values to the read channel to set default read channel operating parameters;
   e) performing a series of seeks in alternating directions over a band of tracks and while performing the seeks:
      i. setting a predetermined read channel parameter to a predetermined variable value from the group of read channel parameters having variable values for a first set of alternating servo sectors;
      ii. applying the table of default values to the read channel for a second set of alternating servo sectors;
      iii. logging the servo errors which occur during the series of seeks;
   f) repeating step e) for each of a predetermined matrix of values selected from the table of read channel parameter variable values; and
   g) selecting the read channel parameter values having the least errors logged to form a table of optimized read channel parameter values for reading servo sectors and wherein the table of optimized read channel parameters is stored in the disk drive.

2. The method of claim 1 wherein the set of servo errors includes a missed servo sync word.

3. The method of claim 1 wherein the set of servo errors includes a missed track identification field.

4. The method of claim 1 further comprising the step of estimating a position of the head and the set of servo errors includes a magnitude of the difference between an estimated head position and a detected head position.

5. The method of claim 1 wherein step e) is repeated for multiple bands of tracks.

6. The method of claim 1 wherein read channel parameters include a pulse detector threshold level, a low pass cutoff frequency of an automatic gain control filter, a high frequency boost of an automatic gain control circuit, and a bias current.

7. In a disk drive having a head mounted on an actuator, a read channel, a disk having a plurality of tracks, each track having multiple sequentially active servo sectors, a sampled signal head positioning servo controller to control the actuator position, a microprocessor, and a memory, a method of deriving optimum read channel parameters for use in reading servo sector data, the method comprising the steps of:

a) providing a group of read channel parameters having default values;

b) applying the group of default values to the read channel to set default read channel operating parameters;

c) performing a seek to position the head over a track within a band of tracks;

d) setting a predetermined read channel parameter to a predetermined value in the read channel;

e) performing a seek within the band of tracks and, while performing the seek, logging errors of a predetermined type which occur;

f) repeating step e) a predetermined number of times while, upon a predetermined condition, interspersing seeks using the default read channel operating parameters of step b) to maintain control of the actuator;

g) repeating steps b) through f) for each of a predetermined matrix of values for the predetermined read channel parameter;

h) repeating steps b) through g) for each of a predetermined group of read channel parameters; and i) selecting the read channel parameter values having the least errors logged to form a group of optimized read channel parameter values and wherein the group of optimized read channel parameters is stored in the disk drive.

8. The method of claim 7 wherein the predetermined type of error is a missed servo sync word.

9. The method of claim 7 wherein the predetermined type of error is a missed track identification field.

10. The method of claim 7 wherein the servo controller includes an estimator to provide an estimated position and the predetermined type of error is the magnitude of the difference between the estimated position and a measured position.

11. The method of claim 7 wherein the steps a) through h) are repeated for multiple bands of tracks.

12. The method of claim 7 wherein the read channel parameters include a pulse detector threshold level, a low pass cutoff frequency of an automatic gain control filter, a high frequency boost of an automatic gain control circuit, and a bias current.

13. In a disk drive, an apparatus for determining optimum read channel parameter values for use in performing servo operations, comprising:

a head for reading data from a disk;

a read channel having a plurality of read channel parameters for controlling signal conditioning circuitry which can be set to a plurality of read channel parameter values;

an actuator for positioning the head over a surface of the disk containing a plurality of servo sectors and data sectors residing within a plurality of concentric tracks;

a sampled signal head positioning servo controller to control the actuator position;

a processor for initiating seeks to be performed, wherein during the seeks, the read channel parameters are tested with a plurality of different sets of the parameter values and a number of detected errors corresponding to each of the sets are logged, the processor determining the optimum read channel parameter values based upon which one of the sets resulted in a fewest number of logged errors; and a memory for storing the optimum read channel parameter values.

14. The apparatus of claim 13 wherein the tracks are grouped into a plurality of zones, the seeks performed over a first zone to determine a first set of the read channel parameter values which are optimum for the first zone and the seeks performed in a subsequent second zone to determine a second set of the read channel parameter values which are optimum for the second zone.

15. The apparatus of claim 13 wherein the memory stores a plurality of default values to which the read channel parameters are periodically set during the seeks to ensure that the servo controller can perform the seeks.

16. The apparatus of claim 13 wherein the errors are comprised of missed servo sync words.

17. The apparatus of claim 13 wherein the errors are comprised of missed track identification fields.

18. The apparatus of claim 13 wherein the servo controller includes an estimator to provide an estimated position and the predetermined type of error is the magnitude of the difference between the estimated position and a measured position.

19. The apparatus of claim 13 wherein the read channel parameters include a pulse detector threshold level, a low pass cutoff frequency of an automatic gain control filter, a high frequency boost of an automatic gain control circuit, and a bias current.

20. The apparatus of claim 13 wherein the read channel parameters are tested according to a design of experiments approach.

21. The apparatus of claim 13 wherein the read channel parameters are tested according to a full factorial approach.

* * * * *